(12) United States Patent
Tonkin

(10) Patent No.: US 6,417,764 B2
(45) Date of Patent: *Jul. 9, 2002

(54) SAFETY SYSTEM FOR VEHICLES

(76) Inventor: Mark Christopher Tonkin, c/o Design Technology and Innovation Ltd., The Barn, Ripe Lane, Ripe, Lewes, Sussex, BN8 6AP (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,770

(22) Filed: Jul. 27, 1998

Related U.S. Application Data (62) Division of application No. 08/765,996, filed on Apr. 29, 1997, now abandoned.

(30) Foreign Application Priority Data

Jul. 15, 1994 (GB) .............................................. 9414393
Jul. 14, 1995 (WO) ................................ PCTGB9501670

(51) Int. Cl.$^7$ ................................................. B60Q 1/00
(52) U.S. Cl. ................... 340/425.5; 340/426; 340/436; 340/903; 307/10.1; 280/729; 280/735; 280/743.1; 701/45; 180/282
(58) Field of Search ............................ 340/425.5, 426, 340/436, 901, 903, 904; 307/10.1; 280/729, 743.1, 743.2, 730.1, 731, 735, 732, 740; 701/45; 180/282, 273

(56) References Cited

U.S. PATENT DOCUMENTS

| | | | | |
|---|---|---|---|---|
| 5,125,400 A | * | 6/1992 | Johnson et al. | 602/13 |
| 5,347,273 A | * | 9/1994 | Katiraie | 340/903 |
| 5,454,595 A | * | 10/1995 | Olson et al. | 280/743.1 |
| 5,582,428 A | * | 12/1996 | Buchanan et al. | 280/741 |
| 5,646,613 A | * | 7/1997 | Cho | 340/903 |
| 5,860,379 A | * | 1/1999 | Moody | 114/54 |
| 5,906,391 A | * | 5/1999 | Weir et al. | 280/729 |
| 5,941,559 A | * | 8/1999 | Rudolf et al. | 280/729 |

FOREIGN PATENT DOCUMENTS

| | | | |
|---|---|---|---|
| DE | 2153941 | * | 5/1972 |
| DE | 2944319 | * | 5/1981 |
| EP | 0455016 | * | 11/1991 |
| EP | 0649776 | | 10/1994 |
| FR | 2129015 | * | 10/1972 |
| GB | 1326207 | | 9/1970 |
| GB | 1373406 | * | 11/1970 |
| GB | 1333269 | | 1/1971 |
| GB | 1371145 | * | 1/1971 |
| GB | 1388636 | | 5/1972 |
| GB | 2222710 | | 9/1988 |
| GB | 2260209 | | 2/1991 |
| GB | 2289786 A | | 5/1995 |
| JP | 2155/854 | * | 6/1990 |
| WO | 870281 A1 | | 10/1986 |
| WO | WO 9209456 | * | 6/1992 |

OTHER PUBLICATIONS

Search Report for U.K. Application No. GB 9414393.0, Mar. 7, 1996.
Search Report for U.K. Application No. GB 9414393.0, Aug. 29, 1995.

* cited by examiner

*Primary Examiner*—Nina Tong
(74) *Attorney, Agent, or Firm*—Baker Botts L.L.P.

(57) ABSTRACT

A safety system for a vehicle has a number of airbags (100–106) typically sited within a recess (108) in paneling of a vehicle (V). To avert the possibility of extensive damage caused by an impact, the airbags are selectively deployed. Each airbag (100–106) has a multi-chambered structure (118–122). The multi-chambered structure of each airbag is further arranged such that the chambers are rupturable separately from one another and are not of a vented type. More preferable, the individual chambers (118–122) are rupturable at different pressures whereby an airbag as a whole provides a cascade of energy absorbing impacts.

19 Claims, 7 Drawing Sheets

SAFETY SYSTEM FOR VEHICLES

This application is a divisional of application Ser. No. 08/765,996, filed Apr. 29, 1997, entitled SAFETY SYSTEM FOR VEHICLES now abandoned.

FIELD OF THE INVENTION

The invention relates to vehicle safety systems including warning means which provide safety information for example to drivers of following vehicles.

DESCRIPTION OF RELATED ACT

A known warning means comprising a vehicle display system is described in WO93/15931 which provides a display system which indicates discrete ranges of deceleration of a vehicle and which can also provide a display to indicate that the vehicle is stationary. All the features of that display system are incorporated in this specification especially when referring to a progressive brake warning (PBW) or vehicle stationary indicator (VSI) display. A known ground speed measuring device is disclosed in WO92/01951 which uses a double horned radar device, again the teachings of that specification are incorporated herein.

The invention seeks, inter alia, to improve known vehicle display systems and ground speed measuring systems.

SUMMARY OF THE INVENTION

According to one aspect of the invention there is provided a safety system for vehicles comprising a controller fitted in use to a subject vehicle, sensor means fitted to the subject vehicle in use and operable to sense a distance of separation and/or a relative velocity of a trailing vehicle and operable to input data signals representative thereof to the controller, velocity sensing means operable to sense the velocity of the subject vehicle relative to the ground and to input to the controller a velocity signal representative thereof, wherein the controller is operable to processes the received velocity signal and data signals to determine the existence of an unsafe condition, and the safety system further comprising warning means controlled by the controller and operable to warn a driver of the trailing vehicle of the existence of the unsafe condition.

Preferably the controller is operable to determine the existence of the unsafe condition by determining a safe distance corresponding to a safety envelope to the rear of the subject vehicle within which any incursion by the trailing vehicle constitutes the existence of an unsafe condition.

This provides the advantage of assisting the driver of the trailing vehicle to more accurately determine the safe distance, drivers typically tending to underestimate the safe distance in the absence of any such warning system.

The safe distance may be determined to be substantially the safe stopping distance of a vehicle travelling at the velocity of the trailing vehicle.

The safe stopping distance may be determined to be proportional to the velocity of the subject vehicle.

Preferably the warning is terminated after the measured value reaches a safe value. The warning can be provided by a display operably carried by the subject vehicle and positioned for viewing by the driver of the trailing vehicle, and the display can comprise a row of lights.

The system may comprise means for warning that the subject vehicle is stationary. The system can further comprise means for providing warning of different levels of deceleration of the subject vehicle. The warning means can comprise an orange light display for the relative speed and/or relative separation conditions and a red light display for the vehicle stationary and/or levels of deceleration conditions. The relative separation and/or relative speed warning may be overridden by the level of deceleration warning.

The system in a preferred embodiment has a radar device having two receiver antenna which device operably communicates with a controller which is able thereby to determine the direction of motion of the vehicle, and warning means which is automatically actuated by the controller to provide a warning when the vehicle moves.

A further warning means can be automatically activated when the vehicle reverses and may comprise an array of lights and/or means for generating sound.

The controller may be operable to determine an enhanced safe distance corresponding to an enlarged safety envelope and the warning means may be further operable to indicate a first level of warning corresponding to incursion by the trailing vehicle into the enlarged safety envelope and a second level of warning which is more prominently presented to the driver than the first level of warning and corresponds to any incursion into the safety envelope.

The size of the enhanced safe distance and enlarged safety envelope will generally be predetermined so as to correspond to typical parameters appropriate for driving under adverse road conditions. These parameters may for example be stored in a look up table allowing the parameters to be determined from the signals received by the controller together with the parameters defining the normal safety envelope.

The safety system may comprise ground condition communication means operable to input to the controller a signal representative of the condition of the ground and or other driving conditions and wherein the controller is operable to determine the enhanced safe distance corresponding to the enlarged safety envelope according to the extent to which the ground condition communication means indicates adverse ground conditions likely to affect traction between the subject vehicle and the ground.

The enhanced safety distance and enlarged safety envelope may thereby be made adaptable to the prevailing driving conditions and the ground condition communication means would preferably function automatically to input data such as whether rain, ice or snow was presenting a driving hazard, the source of the data being either on board sensors or telemetric links to an external system providing relevant data.

Preferably the sensor means is operable to sense both the distance of separation and the relative velocity of the trailing vehicle and the controller is operable to determine whether the relative velocity of the trailing vehicle relative to the subject vehicle when entering the enlarged safety envelope is greater than a threshold value of relative velocity and, if so, is operable to actuate the warning means to indicate the second level of warning.

This has the advantage of delivering a warning with full prominence to the driver of the trailing vehicle before the trailing vehicle has reached the main safety envelope in order to give the maximum available warning to the driver that his closing speed to the subject vehicle is excessive.

In a preferred embodiment the ground condition communication means comprises means fitted to the subject. vehicle for sensing at least one of rain, snow and ice and communicating a signal representative thereof to the controller.

The sensor means for sensing the distance and velocity of the trailing vehicle may comprise a radar system transmitting and receiving radar pulses, from which received pulses information is derived sufficient to determine both the proximity and relative speed of the trailing vehicle.

The safety system may comprise communication means operable between the controller of the subject vehicle and a warning device fitted in use to the trailing vehicle, whereby the warning means is operable to indicate a warning to the driver of the trailing vehicle via the warning device.

The velocity sensing means may comprise a conventional speed sensing device fitted to the vehicle's transmission train and may for example include a hall effect sensor.

The velocity sensing means may alternatively comprise a sensor mounted on the subject vehicle and responsive independently of elements of the subject vehicle's transmission train to movement of the ground relative to the subject vehicle.

In a preferred embodiment the velocity sensing means comprises a sensor constituted by a doppler shift radar device.

An advantage of such sensing means is that it is free from the errors inherent in determining velocity via the transmission train which arise from variation in tyre diameter due to varying inflation pressure, tire wear or other factors.

The controller may also be operable to actuate an impact absorbing device deployed internally or externally of the subject vehicle.

The impact absorbing device may comprise an air bag inflatable so as to be deployed externally of the subject vehicle and/or bumpers extensible by means of hydraulic rams operable to absorb energy upon impact.

The effects of impact may thereby be attenuated prior to the point of collision between the subject vehicle and an object which may be a trailing vehicle for example.

Another aspect of the invention provides a system for vehicles having means for determining the magnitude of acceleration and deceleration of the vehicle and output means enabling the magnitude of acceleration and deceleration to be interpreted by a third party remote from the vehicle. The output means can comprise a visible display having a first form of representation for acceleration and a second form of representation for deceleration. The display can comprise an array of lights mountable on the side of a vehicle. A first coloured array can represent acceleration and a second coloured array can represent deceleration and preferably the number and/or intensity of actuated lights of a given colour represents the magnitude of the acceleration or deceleration.

This aspect of the invention has application for example to racing cars and motorcycles where a visible display mounted on either or both sides of the vehicles enable spectators and cameras to perceive the rate of acceleration or deceleration of the vehicle thereby adding interest and enjoyment. Such displays would not be visible necessarily to the leading or trailing drivers so as to cause minimal interference with the conduct of racing.

Also disclosed herein is a management system for a vehicle comprising a ground speed sensor having means for determining the true speed and direction of travel of the vehicle and means for communicating the speed and direction of travel of the vehicle to a controller which operably controls a second vehicle device in response to the speed or direction information.

Preferably the system is adapted to perform any one, or any combination of the following functions: active sensing for cruise control, or comparison with actual wheel speeds for anti-lock braking systems and/or active traction control, provision of any one of the following: driving speed over ground display, distance covered, fuel economy measurement, elapsed journey time and estimating time of arrival at destination, average fuel economy over journey; automatic triggering of airbags; change gear in electronic automatic transmission vehicles.

Such a system can also include the features of all the other aspects of the invention.

According to a further aspect of the invention there is disclosed a safety system for vehicles comprising an antilock braking system fitted to a subject vehicle and operable to regulate operation of the subject vehicle's brakes in response to a signal generated by a speed sensor and representative of the speed of the subject vehicle relative to the ground, characterised in that the speed sensor is a radar system operable to direct radiation towards the ground and to determine the speed by receiving and analysing radiation reflected from the ground.

The radar system may be operable to determine speed by measurement of a doppler shift in the frequency of the reflected radiation.

According to a further aspect of the invention, there is disclosed a safety system for vehicles comprising at least one impact energy absorbing device fitted to a subject vehicle, sensor means fitted to the subject vehicle and operable to detect the proximity and closing speed of an object external to the subject vehicle, determining means responsive to output signals of the sensor means for determining whether the object is about to impact with the subject vehicle and actuating means responsive to the determining means to actuate the at least one impact energy absorbing device so as to be deployed at a position externally of the subject vehicle so as to be between the object and the subject vehicle.

The impact energy absorbing device may be an inflatable bag device comprising two or more inflatable bags deployed when inflated so as to constitute successive layers including an inner bag proximate the subject vehicle and an outer bag distal to the subject vehicle.

The safety system preferably comprises deflation means operable to deflate one or more of the bags in response to pressure within the respective bag exceeding a predetermined pressure level.

The deflation means may be operable to deflate bags in successive layers at pressure levels which decrease progressively from the inner bag to the outer bag whereby in use the outer bag is deflated prior to deflation of the inner bag in response to impact between the object and the subject vehicle.

The deflation means may comprise rupturable membranes forming parts of side walls of respective bags and arranged to rupture at respective predetermined pressure levels.

In a preferred embodiment the air bag device comprises three inflatable bags.

The preferred comprising a plurality of air bag devices located so as to be deployed at the front, rear, left side and right side respectively of the subject vehicle.

Alternatively the impact energy absorbing device comprises at least one bumper extensible by means of hydraulic ram means capable of absorbing energy when the bumper receives an impact.

A yet further aspect of the invention provides a safety system for vehicles comprising a ground speed measuring device and/or input detection means and a controller operable to activate a spraying device to release safety chemicals such as foams when an accident is likely.

Another aspect provides an antenna for a radar system comprising means for coupling the antenna to a radar system to enable electromagnetic radiation from the radar to be transmitted through the antenna and for reflected radiation to be passed back to the radar-through the antenna, said antenna further comprising a body portion which is wedge-shaped. The wedge can taper to a tip of less than 1 mm thickness. Preferably the antenna is made at least partially of PTFE.

Yet another aspect of the invention provides a housing for a radar system having means for communicating electromagnetic radiation into a waveguide which directs the radiation along two paths in two separate directions each leading to an output, the housing being adapted to accommodate receiving antennas in each of the radiation paths, the housing further comprising wedge-shaped antenna at the outputs for transmitting and collecting reflected radiation. The receiving antenna accommodation can be separated by half a wavelength of the radiation.

Another aspect of the invention provides a housing for a radar system having an inlet for electromagnetic radiation which leads to a waveguide which directs the radiation along two paths to two separate outlet/inlet horns wherein the horns taper along their length in one transverse dimension relative to their longitudinal axis.

The horns can taper outwardly. The horns can be turned inwardly such that radiation emitted from one horn is directed to intersect with the radiation from the other. Preferably the housing is adapted to accommodate two receiving dipoles equidistantly spaced from a point where the two paths meet.

BRIEF DESCRIPTION OF THE DRAWINGS

Embodiments of the inventions will now be described, by way of example only, with reference to the accompanying drawings, in which.

DETAILED DESCRIPTION OF THE PREFERRED EMBODIMENTS

Figure 1:
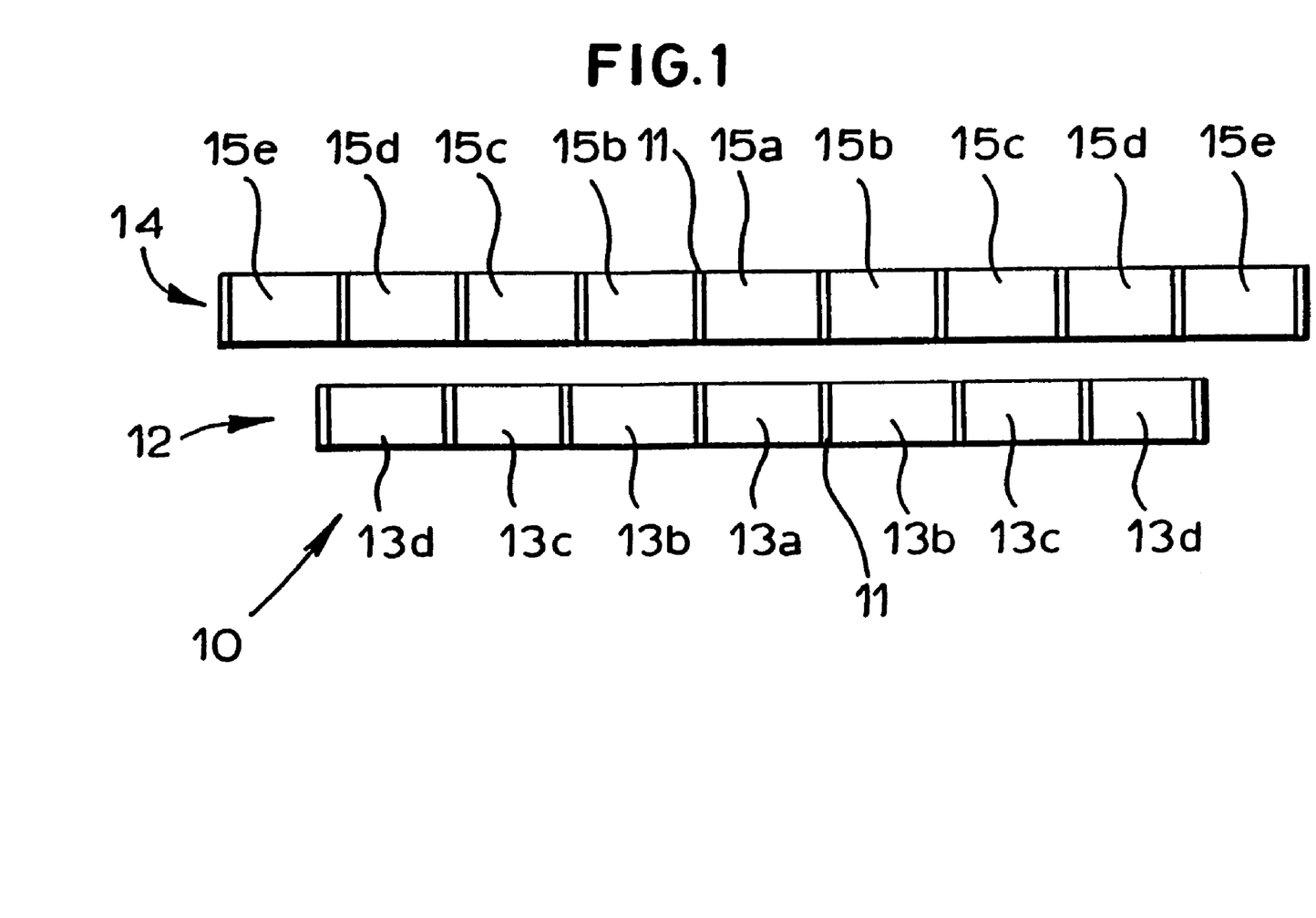
FIG. 1 is a schematic front elevational view of vehicle display systems according to the invention.
Figure 2A:
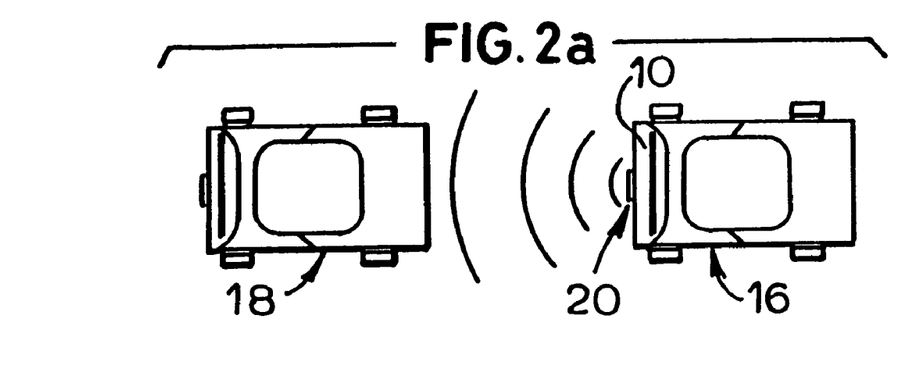
FIG. 2a is a schematic plan view of two vehicles fitted with a vehicle display according to the invention.

Referring to FIG. 1 there is shown a display system 10 according to the invention comprising a safety display constituted by a first light array 12 for providing warning signals relating to relative parameters between a subject vehicle 16 and trailing vehicle 18 as shown in FIG. 2a.

A display comprising a second light array 14 can provide information relating to the level of deceleration of the subject vehicle and/or whether the vehicle is stationary or not. Thus the second light array 14 is similar to that described in WO93/15931 and can be operated in the same manner as described therein or alternatively using the system to be described here. The second light array 14 comprises a central lamp 15a and four pairs of lamps 15b, 15c, 15d and 15e. Central lamp 15a can be a central high mount stop lamp (CHMSL) which is triggered by a switch on the brake pedals of a vehicle and not used under PBW or VSI conditions. Pairs of lamps 15b to 15e can then act in the same manner as lamps 10 to 17 described in WO93/15931 for example.

When acting as a vehicle stationary indicator (VSI) a preferred from of display is to illuminate all lamps 15 in the second light array 14 at a starting point in a cyclic variation in the number of lamps illuminated. The second stage is to deactivate central lamp 15a, then to illuminate all lamps, followed by deactivating both lamps 15b and then lighting all lamps. This is followed by deactivating both lamps 15c momentarily and then activate all lamps and so on until all pairs of lamps have been deactivated in succession and the cycle begins again. For example, the time period for each step could be less than 1 second and preferably in the order of 0.1 second.

Figure 2B:
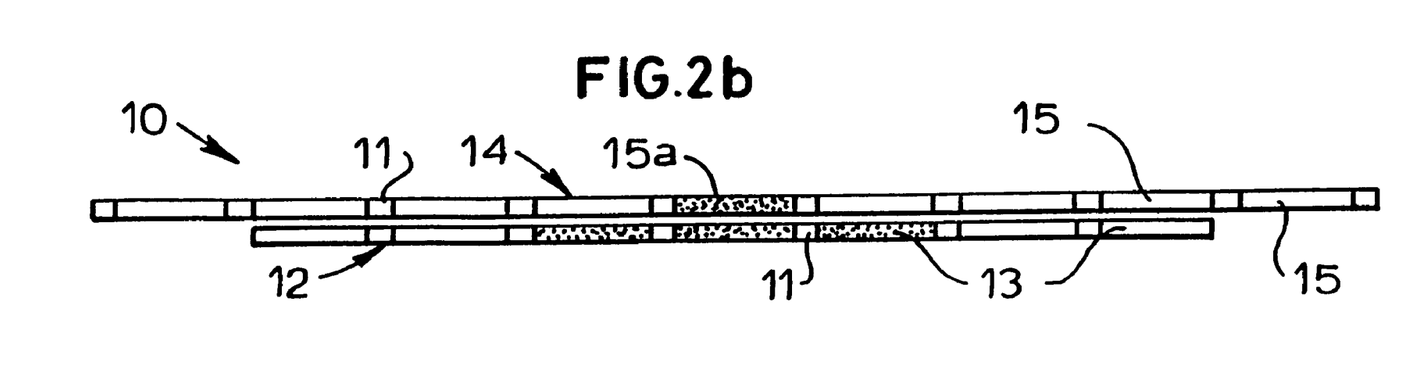
FIG. 2B shows a second embodiment of the display shown in FIG. 1 in an active state.

As can be seen from FIGS. 1 and 2b, the individual lamps 15 are preferably distinguishable from one another. The width of separating sections 11 between lamps 15 can be as much as the width of the lamps for example. In another form, section 11 can have a variable width to ensure that the lamps remain distinguishable when a trailing vehicle 18 is some distance behind. A proximity sensor, if used only for the function of determining separation need only comprise a one horn version of the radar described later.

Thus the stationary indication signal is found to be very effective since a clear array of lamps, such as red lamps, is displayed at the rear of the subject vehicle 16 which is apparently expanding due to the outward motion of the deactivated pairs of lamps. With regard to use of second light array 14 as progressive brake warning display (PBWD) it is found that the initial levels at which the pairs of lamps 15 are illuminated are optimally for deceleration in the ranges 0.05–0.1 g and 0.1–0.25 g, say. Advantageously, by using a ranging device, or proximity sensor, these ranges can be varied depending on the proximity and/or closing speed of the trailing vehicle 18. For example the initial level of PBW could be illuminated for deceleration in the range 0.025 to 0.05 g; the second level becoming 0.05 to 0.1 g, for example, and so on. Thus, of course, the PBW signal could be illuminated at the same time as the first light array 12 to provide an enhanced danger warning to a driver of a trailing vehicle, or other forms of display as described later could be provided.

In an improved system over that described in WO93/15931, a radar system similar to that described in WO92/01951, or as described later herein, can be used to provide information regarding subject vehicle velocity and direction of travel. By sampling ground speed measurements rapidly and using a time reference a microprocessor control system can for example provide accurate information about a vehicle's acceleration or deceleration at any given time. Accordingly, such a system can suitably be used to control the display shown on the second light array 14.

Such a microprocessor control system linked to such a round speed sensor can be used to provide a velocity readout to the driver of the subject vehicle 16, also information regarding the distance covered in a given journey can be relayed to the driver or otherwise logged. A key feature is that the speed sensor can very accurately measure actual, true or absolute, speed over the ground, or changes therein. It is not dependent for example on the diameter of tires as is a system which counts the rate of rotation of a vehicles' tires. Such known systems are prone to large errors in the order of 5% of the actual speed and critically this error increases with use of the tires due to wear (and a reduction of tire diameter) and also critically with increasing speed of vehicle.

By inputting information to the microprocessor regarding the fuel consumption of an engine, fuel economy can be calculated and for example information can be provided to the driver regarding the most appropriate gear to be selected. Information regarding acceleration or deceleration can be provided to the driver. Additionally, in a preferred form, an acceleration and deceleration display is provided by an array of lamps comprising two rows, one to indicate the level of acceleration for example in green and a second row to indicate the level of deceleration in red. Such an array of lamps can be attached to the side of a racing car for example such as a formula one vehicle in order to provide spectators with an indication of the changing speed of the racing car. Of course, alternative displays on the vehicle might be used instead of rows of lamps.

By providing a keypad or other communication means for a driver to input information to the microprocessor, a sophisticated vehicle management system can be provided.

For example, the driver could inform the system of his present location and destination such that the system can calculate the distance of journey from a database of journey distances. The driver can then be provided with distance remaining information and estimated times of arrival, as well as average fuel economy over journey. Alternatively, the information might be stored rather than displayed to the driver and extracted for example when servicing the vehicle in order to observe if any significant change in performance of the vehicle has taken place.

The ground speed sensing system of WO92/01951 as adapted herein, can also be used in active sensing for cruise control applications. Additionally, comparison of ground speed with wheel speed can be used in anti-lock braking systems and traction control systems for either two or four wheel vehicles for example. Thus, accurate ground speed measurement can be used to control the optimum rate of pumping of brakes in an ABS system. In particular, an intelligent ABS system can be provided which when the vehicle is travelling at low speeds, overrides the anti-lock braking system in order to allow wheel locking which can be useful in certain conditions such as in snow or similar conditions. Similarly, the accurate ground speed measurements can be used to compare the speed of revolution of tires, or other traction means such as trail wheels or tank treads for example, of a vehicle in order to enhance traction control systems. In known systems an independent vehicle speed measurement is not made and thus the present system can be used to accurately predict the required tyre revolution rate for a given speed.

The display constituted by the first light array 12 shown in FIG. 1 comprises an array of seven lamps 13 which are operated using a microprocessor control system not shown. The control system is designed to activate display 12 to provide a warning signal to a driver of the trailing vehicle 18 when the trailing vehicle is closing too rapidly on the subject vehicle 16 for example, alternatively a warning signal is displayed when the trailing vehicle 18 is too close to the subject vehicle 16. Even if they are travelling at the same speed for example, there are known safe stopping distances such as those published by the Minister of Transport, in which a vehicle will stop when the brakes are applied. Accordingly, by knowing the velocity of the subject vehicle 16 for example preferably using the radar ground sensing system described herein, which provides therefore a true ground speed, or other means in communication with a microprocessor control system and by using a proximity sensor 20 to determine the separation of the subject vehicle 16 from the trailing vehicle 18 a safety envelope can be created behind the subject vehicle 16. Intrusion in the envelope by the trailing vehicle 18 causes an initial level of lamps 13 in array 12 to be lit.

For example, all lamps 13 could be illuminated. Alternatively, only lamps 13*a* and 13*b* might be illuminated in the first instance when the safe distance is broken by the trailing vehicle 18 and pair 13*c* might be illuminated if the trailing vehicle then encroaches a further predetermined distance and similarly 13*d* could be activated upon a further encroachment. For example, the safe separation distance (or stopping distance) of vehicles travelling at 30 mph is 25 meters such that in an example lamp 13*a* might be illuminated if the trailing vehicle 18 encroaches more than 25 meters behind the subject vehicle 16, lamp 13*b* could be illuminated in addition to lamp 13*a* if the trailing vehicle gets closer than 20 meters. Lamp 13*c* could be illuminated if the trailing vehicle comes closer than 15 meters and 13*d* could be illuminated when the trailing vehicle reaches 10 meters from the subject vehicle 16. In a further example, all the lamps may be turned on and off if the trailing vehicle gets still closer.

Thus a warning system has been described using a ground speed sensor for a subject vehicle 16 coupled by a microprocessor with a proximity sensor 20. In a more sophisticate version, proximity sensor 20 could be a radar device described herein for measuring velocity and could therefore be used to measure the relative velocity of a subject vehicle 16 and trailing vehicle 18. By knowing the closing speed of the trailing vehicle 18 predetermined values could be used to trigger warning displays if the closing speed is too great. For example, a look-up table or database could again be provided for unsafe closing speeds. This look-up table might again be varied according to the velocity of the subject vehicle 16 in a similar manner to the safe stopping distance, or safety envelope distance. Therefore, whilst the safety envelope distance at 30 mph is 25 meters, if the trailing vehicle is closing too rapidly, say, a difference in speed of 30 mph, then the warning signal could be activated even when the trailing vehicle 18 is 50 meters behind the subject vehicle 16.

In an alternative form, the activation of the warning display, in other words the value of the safe limit, depends on the prevailing road conditions. It might be, for example that, a keypad or other communication means is provided so that the driver can input information regarding weather conditions. Alternatively, a sensor could be provided which is linked to the microprocessor to indicate whether the road is wet and the severity of the wet, icy or snowy conditions. Alternatively, such information could be provided on a local basis using a regional radio system to update a microprocessor memory via a radio receiver. In this way hazardous weather conditions can automatically be put into a vehicle management system comprising the processor herein described. Additionally, this system is advantageous in that when the vehicle is driving over long distances changes in weather conditions from one region to another can automatically be input to the microprocessor. The information regarding the weather might be obtained for example by enabling the warning system controller to ascertain if the windscreen wipers are in use or have been in use recently due to rain (and not used with a water spray to clean the windscreen). Alternatively, or as well, frost sensors, such as air temperature sensors (with adjustment for wind chill e.g. through look-up data) can be used. Thus, safe stopping distances can be adjusted for prevailing weather conditions, again by providing stored values according to weather and possibly for different severities of poor weather. Alternatively, a two level warning system can be provided wherein, a first warning, e.g. turn on all lamps 13, when a trailing vehicle 18 encroaches within the safe stopping distance of the subject vehicle 16 for poor weather, and a second warning e.g. flash all or some lamps 13, if the trailing vehicle encroaches within the safe stopping distance for good conditions. The latter warning is intended to be especially irritating to cause the driver to pull back. Multiple levels of warning for closer encroachment could be an increase in the frequency and/or intensity of the flashing lamps. For example flash rates could be increased in 2 Hz increments from 2 Hz upwards for increasing proximity. Also, it is possible to illuminate lamps 13 in different patterns, e.g. randomly, or 13a alone then all pairs 13b, 13c and 13d together.

Thus, the display constituted by the first light array 12 could be used in a two-stage signal for example illuminating only lamps 13a and 13b in good weather conditions but illuminating all seven lamps 13a to 13g when weather conditions are poor even though the value of the safety envelope has been increased.

Naturally, when the trailing vehicle 18 falls away from the subject vehicle 16 beyond the safety envelope limit or decelerates to a level below the unsafe closing speed, then the warning display can be automatically deactivated.

In a preferred form of the display system 10 the row of lamps 15 are red whilst lamps 13 are yellow. They are preferably positioned in the lower part of the rear window of the subject vehicle 16 or similar position so that they can easily be seen the by a driver of the trailing vehicle 18.

In an alternative form of the safety warning system, rather than providing the first light array 12, it would be possible to link the microprocessor to an existing fog lamp on the subject vehicle 16 and to activate the fog lamp automatically when any of the present conditions are violated. Naturally, rather than using a database of look-up tables, the microprocessor might use an algorithm to calculate safe values for any given set of conditions.

In an alternative form, only a single row of lamps is provided so that the first light array 12 is dispensed with. The individual portions of the second light display such as 15a and 15b could comprise reflectors or translucent coverings of different colours in front of bulbs actuated for the different systems (safety envelope, VSI, PBW). In another preferred form, say seven red LED's are provided for each lamp portion (15a say) to represent the progressive brake warning display and the vehicle stationary indication whilst seven yellow LED's are provided for each segment to represent the safety warning display. In this case, the progressive brake warning system could take priority over the safety envelope information and for example expand the number of red lights could chase yellow lights outwards such that depending on the level of deceleration and the extend of violation of the safety distances, both red and yellow lights could be displayed at the same time. For example, if the proximity violation signal was set, causing illumination of central lamp 15a and pair of lamps 15b, any light braking would automatically change lamp 15a to red (in this manner acting as a CHMSL) whilst lamps 15c could also be actuated to emit yellow light as well as lamps 15b. Naturally, since the subject vehicle 16 is decelerating at this time, further yellow lamps might be illuminated if the trailing vehicle 18 does not take appropriate action by decelerating itself.

In an alternative form, the severity of encroachment or level of deceleration can be displayed by increasing the intensity of the lamps actuated in the display system 10. A useful way of varying the light intensity is to drive LED's using a pulse train, the frequency of which is increased in order to increase intensity. For example, by driving a first lamp or LED array at say 67 Hertz (or other frequency above that perceived by the eye as flashing) a first level of intensity is perceived. As a second stage of illumination, a first and second lamp might be driven at, say, 90 Hertz or approximately a 30% increase in rate. A further level of severity depicted by the warning display can be achieved by increasing the number of lamps displayed, for example, lamps 15a to 15c and increasing the rate of illuminating by a further 30%. A yet further level can be achieved for example by illuminating lamps 15a to 15d and further increasing the repetition rate by say 40% so that the lamps are actuated twice as quickly as the original rate. This results in an increase in intensity of the lamp of some 40 to 50%. By way of example of the display, FIG. 2b shows the situation of light braking discussed earlier and also vehicle encroachment within the safety envelope. Hence, CHMSL 15a is illuminated and also essential and in a pair of lamps of the first light array 12 are illuminated.

Beneficially the rise time to near maximum intensity of an LED is much shorter than that for a standard bulb, this means, for example, that a much quicker initial display effect can be achieved as well as enabling the pulse control just described for relatively short 'on' pulses without loss of performance. A further advantage of using LEDs is that they can emit light e.g. directionally and thus the drivers of cars in lanes adjacent the subject vehicle 16 need not have the safety display forced on them, or at least not a bright display. Means can be used to make the LEDs appear as one light—such as by a focusing lens, or the display can allow the LEDs to be seen individually.

For all the systems described a similar safety display can be provided inside the trailing vehicle 18 which is visible to the driver. Thus communication means between vehicles can be used.

Figure 3:
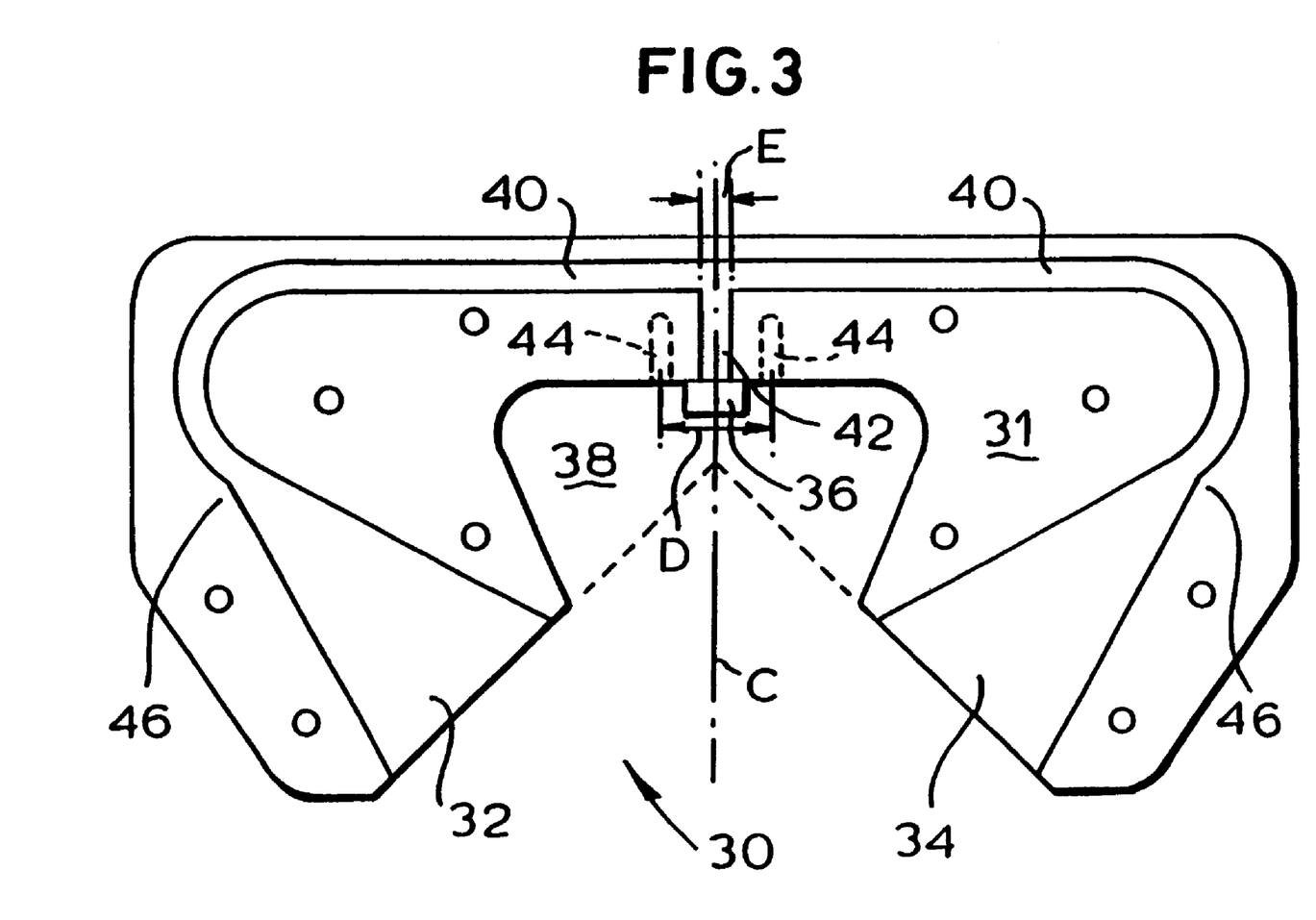
FIG. 3 shows a front elevational view of part of the radar system according to the invention.
Figure 4:
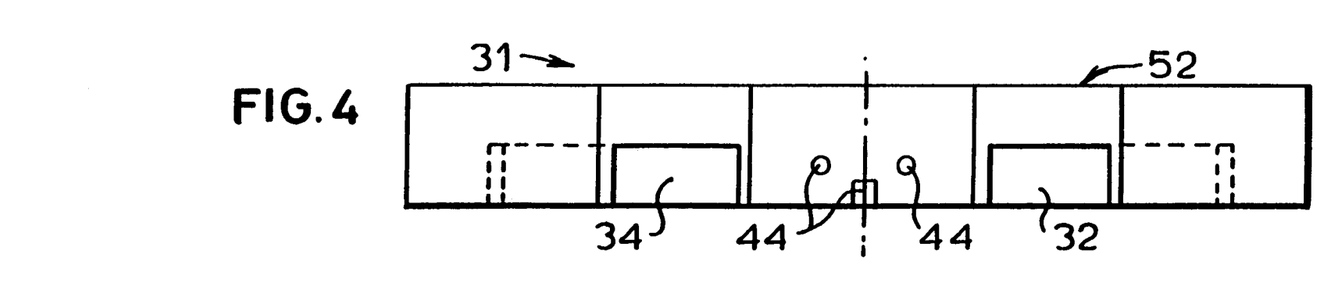
FIG. 4 is a plan view from below of the radar part shown in FIG. 3.
Figure 5:
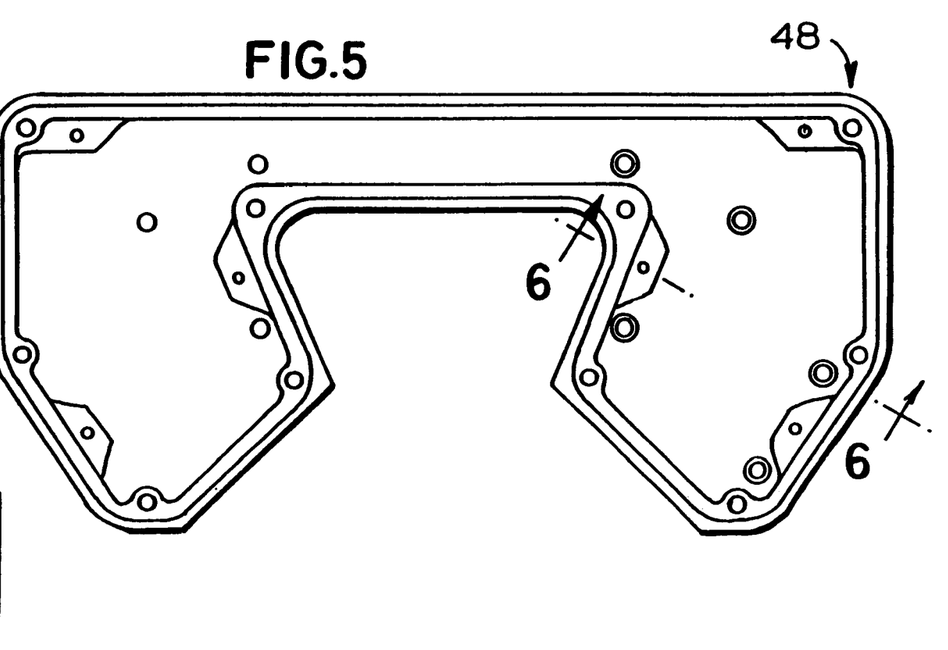
FIG. 5 is a rear elevational view of the radar device shown in FIGS. 3 and 4; whilst

Referring to FIGS. 3 to 5 there is shown a first embodiment of a housing 30 comprising a front plate 31 for a radar device according to the invention. Housing 30 comprises an input channel 42 which splits into two channels 40 which lead to two outlet/inlets or horns 32 and 34. A radiation generator 36 produces electromagnetic radiation of a suitable wavelength such as in the microwave or radio wavelength regime. For example, microwave radiation in the order of 24.125 giga Hertz can be used where the dimension E of input waveguide or channel 42 could be 4.32 mm. The basic operation of the radar is known from WO92/01951 and it will be appreciated therefore that the radiation passes through channels 40 and horns 32 and 34 which then also act as receivers which return reflected radiation back to channel 40 where a signal is received by dipole antennas or, as referred to in the art, diodes 44 suitably positioned equidistantly from axis C running through channel 42. The diodes 44 can be positioned one quarter wavelength apart from axis C such that dimension D could be about 17 mm and naturally the wavelength of the radiation could be varied in order to ensure that the diodes 44 are suitably positioned. Other electronics used in the processing of the signal from diodes 44 can be placed in cavity 38 between the horns 32 and 34. Preferably the cavity is protected by a plate 52 as shown in FIG. 4 which extends across cavity 38 from the ends of housing 30.

Figure 6:
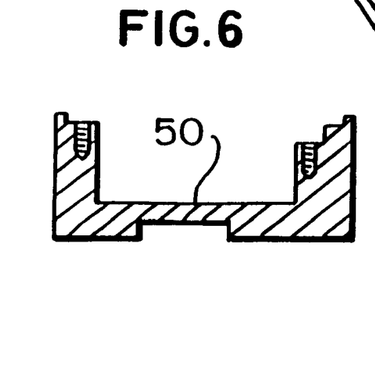
FIG. 6 is a sectional view taken along 6—6 of FIG. 5.

It can be seen from FIG. 4 that whilst horns 32 and 34 are flared in the front elevation shown in FIG. 3, they have a uniform depth. This is quite unlike known housings of this type wherein the horn is also tapered in this direction. This provides the benefit of reduced manufacturing costs when preparing front plate 31 for housing 30. For example, the housing block can be cast, moulded or milled or otherwise suitably formed but does not now require a difficult shape to be produced for the horns 32 and 34. As shown in the front elevational view of rear plate 48 of housing 30 and in particular in FIG. 6 of the section taken along line 6—6, the rear wall 50 of back plate 48 is flat from left to right and so it too is no longer tapered in the transverse direction. Additionally, by providing a large cavity particular advantages are obtained in being able to place all the electronics used to drive the radar within this cavity. This is also found to reduce manufacturing costs as well as reduce electromagnetic interference in operation. Additionally, benefits are obtained in the ease of fitting the radar system to the subject vehicle 16 for example or other body since only the housing itself needs to be attached and a simple communication channel can then be connected to the radar to communicate with the vehicle or other system. For example a simple cable connection could be used for a communication path and this could also provide a path for power supply to the radar.

Figure 7:
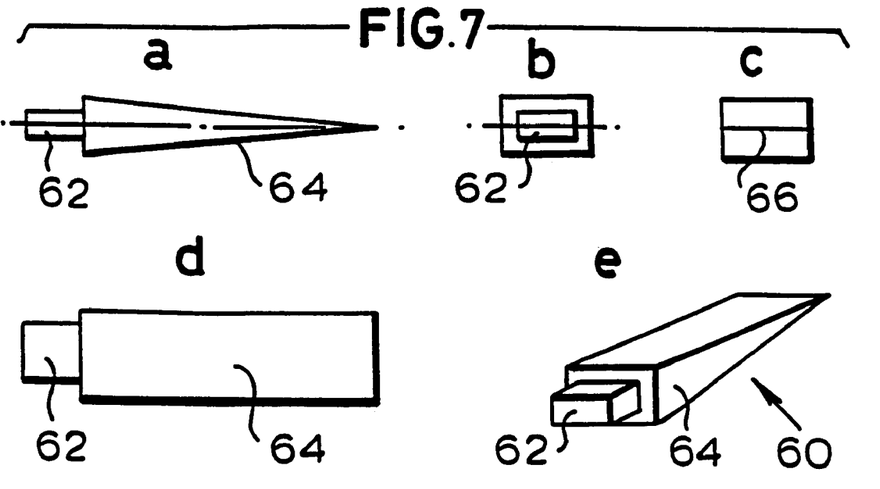
FIG. 7 provides five views (A to E) of a wedge device suitable for use in a radar system according to the inventions.
Figure 8:
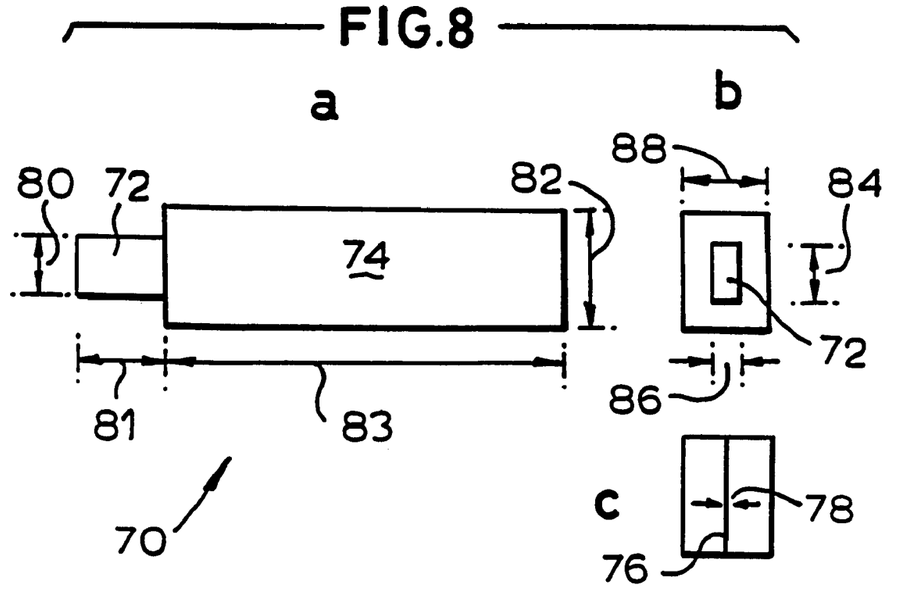
FIG. 8 provides three views of a second embodiment of a wedge according to the invention.
Figure 9:
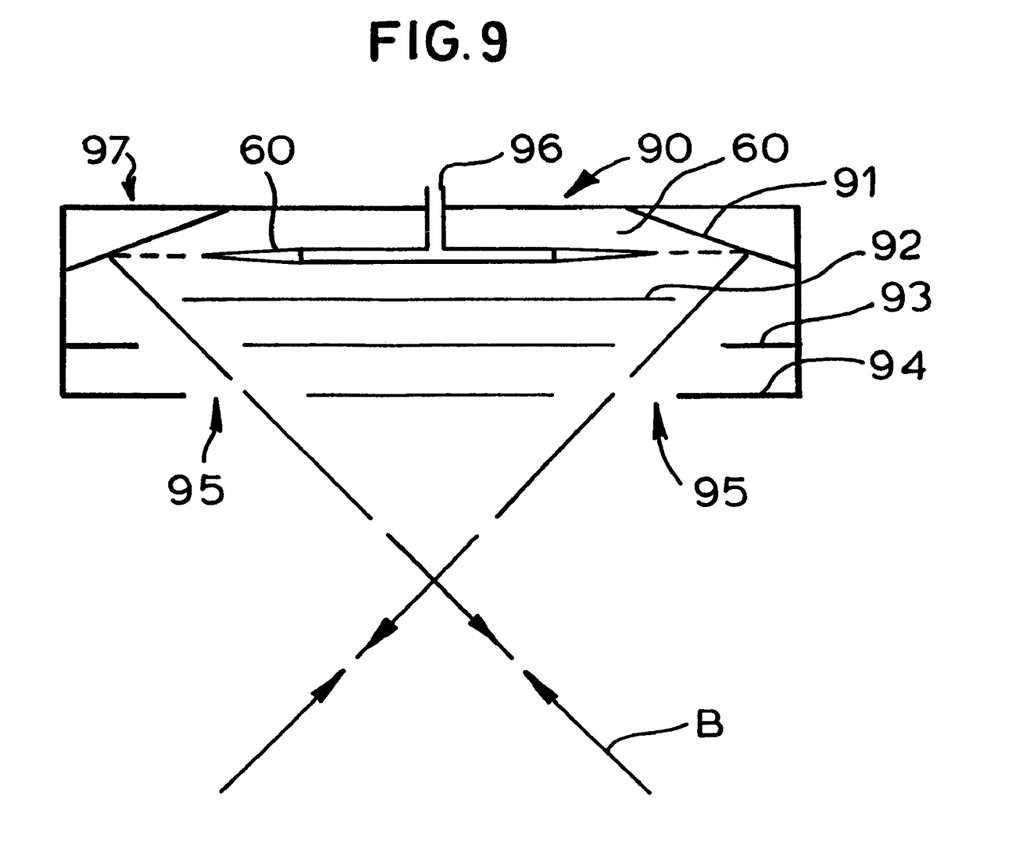
FIG. 9 is a sectional side view of a second radar system according to the invention.

In an alternative embodiment a wedge such as 60 or 70 as shown in FIGS. 7 and 8 respectively is used in place of a horn on a radar device of FIG. 3. For example, housing plate 31 could be used by removing horns 32 and 34 along with the rest of the casing to leave a rectangular aperture at point 46 at the ends of channel 40. A wedge 60 or 70 having a suitably sized connecting lug 62 or 72 respectively can then be inserted into the channel at point 46 to provide both a transmitter and receiver for the radar. A radar 90 is shown in FIG. 9 which could comprise wedges 60 or 70.

As can be seen from FIG. 7e, the antenna 60 can be seen to be wedge shaped, tapering in its transverse dimension from a rectangle at the connecting end adjacent to lug 62 to a tip 66 at the other end. Three views are provided of a further embodiment of a wedge shaped antenna 70 where its dimensions could for example be as follows: 80, 10.68 mm; 81, 10 mm; 82, 13 mm; 83, 60 mm; 84, 10.68 mm; 85, approximately 1 mm but preferably less; 86, 4.68 mm; and 88, 6 mm. The antenna could for example be made from PTFE but other suitable materials could be used which are transparent to microwaves and, radiowaves, or the particular type of radiation being used.

As can be seen from the drawings, the antenna tapers in only one dimension and is therefore relatively simple to manufacture. The orientation of the antenna relative to a suitably adapted housing 30 is such that antenna 60 or 70 is positioned so that its inwardly directed taper is in the same direction as the outwardly directed taper of horns 32 and 34 shown in FIG. 3. Thus, if inserted at points 46 in FIG. 3, antenna 60 would appear as shown in FIG. 7a. A particular benefit of using wedge antennas is that they themselves prevent the ingress of dirt or other particles into the radar housing.

As is known from WO92/01957, there are certain critical factors necessary to obtain accurate directional and speed information from a radar of the type having two mixing points for reception of a signal by two diodes. The skilled man is therefore referred to that document for reference to how to obtain the information from such a system, and all such information is incorporated herein by reference.

It is found that by reducing the cost of manufacture and improving for example the ease of fitting of a suitable radar system, a device can be provided which can more economically be produced and viably used to obtain the benefits of the system.

The reduction in cost of this type of radar enable it to be used for example in proximity sensing to determine the separation of an object from the radar system as well as in speed and direction monitoring. Therefore, a radar system of the above designs can be used in relation to the display system described in WO93/15931 to provide both the information for determining deceleration of a vehicle independent of the braking system and also for providing a proximity sensor in order to terminate the display signal as described in that patent. Since the data devised from such a system provides directional information, it can be linked to any safety system described herein to give a warning regarding the direction of movement for example of a vehicle. This is beneficial for large vehicles especially when reversing and an audible as well as visual warning can be given.

FIG. 9 shows a radar system 90 capable of the various functions described herein, where the waveguide horn 60 are additionally perfected by a housing comprising a series of shields 92, 93 and 94 which protect the radar waveguide and horns from outside elements. Each of the protection panels 92 to 94 comprise an aperture 95 which enables a beam B to be reflect on an internal reflector 91 thereby enabling beams to be received and transmitted from horn 60. The radar system 90 comprising an incoming waveguide 96 from a radar or microwave source for example, and receiving diodes not shown.

Beneficially the radar, or ground speed sensor 90, is easy to manufacture, low cost and can house all the electronics at the back of its casing thereby reducing space requirement and enabling ease of fitting to the underside of a vehicle chassis for example. Advantageously, the surrounding casing 97 protects the antenna 60 and electronics from water and dirt for example. Thus, the attenuation of signals due to these factors can be mitigated.

Figure 10:
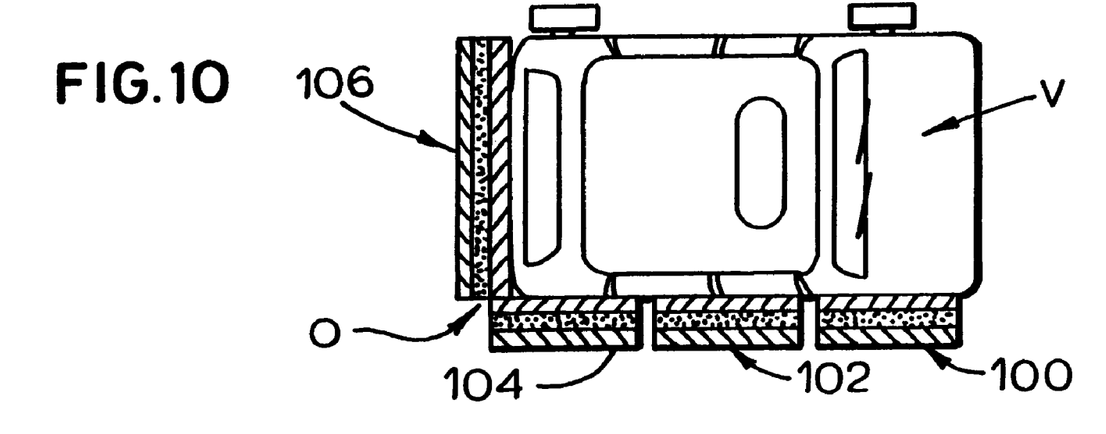
FIG. 10 is a plan view of a vehicle having an airbag system according to the invention.

FIG. 10 shows a vehicle V having an airbag system according to the invention. The airbag system comprises airbags 100, 102, 104 and 106 which protrude outwardly from the side and end panelling of the vehicle. The entire side and end surfaces of a vehicle could be protected with such an airbag system in a preferred form. In FIG. 10 the airbags 100 to 106 are shown in an expanded operable position ready to absorb impact from another vehicle or crash barrier for example.

Figure 11:
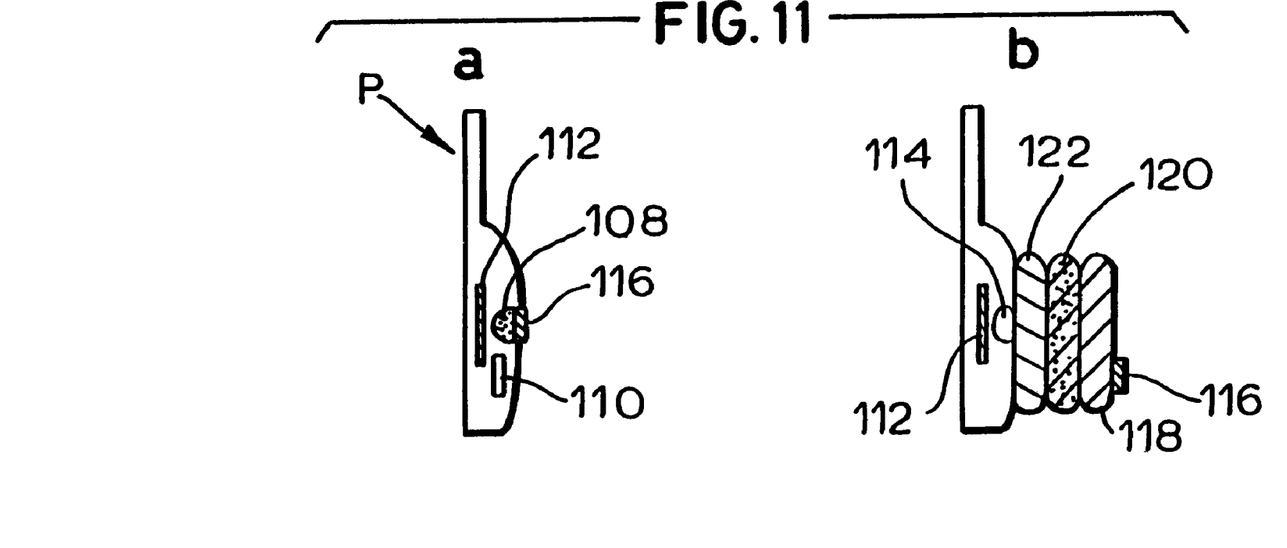
FIG. 11 provides two sectional side elevation views of a door panel having airbags according to the invention.

FIG. 11 shows one airbag e.g. 102, in a contracted state within a recess 108 in the vehicle side panel P. The airbag can be expanded using for example a pressurized gas system 110, in an emergency. Each airbag and airbag chamber can be inflated separately. For example, airbags at the front of the vehicle can be activated upon rapid deceleration of the vehicle detected by a ground speed sensor described herein for example. As a very final response level in the intelligent safety envelope system described herein, airbag 106 could be expanded or deployed if the safety system detects that the trailing vehicle 18 is approaching vehicle V at a rate that impact is inevitable.

In a preferred form as shown here, the airbags e.g. 102 comprise a series of airbag compartments such as 118, 120 and 122. All three airbags are housed within recess 108 and protected by device 116 which can attach to the vehicle side panelling. In the expanded state, all three protrude from the vehicle side panelling as to provide cushioning against impact. Preferably, the compartments are rupturable separately from one another and are not of the known vented type. More preferably the compartments are rupturable at different internal pressures by for example airbag 118 ruptures at a lower pressure than airbag 120 which in turn explodes at a lower pressure compared to airbag 122. Thus a cascade of energy absorbing impacts between the airbags and an external body is provided.

For example, the individual airbag compartment 118 etc can be made for example from a somewhat elastic resilient material which is provided with a rupturable device of some description which is calibrated to allow gas to escape from the compartment when the internal pressure within the compartment exceeds a predetermined level. In an alternative form, the internal bag bursts at the lowest pressure with the cascade working in the opposite sense described above. In alternative forms, any number of bags or compartments can be provided in a series extending outwardly from the vehicle from say 2 to 10 or more.

Beneficially, the airbags help to prevent intrusion of an outside object into a vehicle. Additionally, the corners of a vehicle can be protected by providing overlapping airbags from the sides and ends of a vehicle as shown at position O in FIG. 10. The airbags could be made from extremely strong materials such as plastics or fibrous composites for example which resist bursting other than by the designed rupturable means. Thus, the airbags will protect the driver or passengers in the vehicle from sharp objects since the bags will tend to resist intrusion of a sharp object due to the strong materials.

The side input airbags/compartments can be inflated upon detection of a closing object using a proximity sensor positioned to detect objects at the side of the vehicle. Preferably the sensor enables calculation of the closing speed of the object and whether impact is inevitable. Inflation of any of the external airbags could also be used to cause inflation of any internal airbags.

The air bags of FIG. 10 may be replaced by bumpers disposed along the rear of the subject vehicle and optionally the sides and front of the subject vehicle, the bumpers being mounted on rapidly extensible hydraulic rams of a type which facilitate the absorption of impact energy. Instead of inflating air bags as described above, the hydraulic rams could be actuated by the controller in order to deploy the bumpers in order to provide means for absorbing impact energy. The controller would therefore be operable to determine from proximity and closing velocity information whether an impact with a trailing vehicle or other object was likely to be about to occur and to actuate the impact energy absorbing means accordingly so as to deploy either the air bag or bumper devices to positions externally of the subject vehicle and between the object and the subject vehicle at the expected point of impact.

Throughout the description and claims the term trailing vehicle is used to indicate a vehicle separate from the subject vehicle and which is generally proceeding so as to follow the subject vehicle, typically along a common roadway or railway.

What is claimed is:

1. An airbag deployment system for a vehicle, the system comprising:

at least one airbag housed in the vehicle having an interior shell;

a controller operable to determine whether to deploy the at least one airbag; and means for inflating the at least one airbag in response to actuation by the controller, the at least one airbag having a plurality of inflatable chambers, wherein the at least one airbag is positionable relative to the interior shell of the vehicle when deployed in use, said means for inflating arranged to inflate independently the plurality of inflatable chambers to cause, in use, coexistence of inflated states of individual chambers of said plurality of inflatable chambers.

2. An airbag deployment system as claimed in claim 1, comprising deflation means to enable deflation of at least one of the chambers at a predetermined pressure level in response to an impact.

3. An airbag deployment system as claimed in claim 2, wherein the at least one chamber is defined by a chamber wall formed of a relatively strong material which is resistant to bursting and a rupturable membrane portion constituting the deflation means.

4. An airbag deployment system as claimed in claim 1, comprising sensor means communicating with he controller and operable to determine a relative change in proximity to the vehicle of objects external to the vehicle.

5. An airbag deployment system as claimed claim 4, wherein the sensor means co-operates with the controller to cause the controller to actuate inflation of the at least one airbag in advance of a collision between said vehicle and an object external thereto.

6. An airbag deployment system as claimed in claim 5, wherein said recess is in side paneling of said vehicle and the protective device is attached to the side panelings.

7. An airbag deployment system as claimed in claim 1, wherein an airbag is housed within a recess in the paneling of said vehicle, the recess being closed by a protective device attached to the paneling.

8. An airbag deployment system as claimed in claim 1, wherein the vehicle is provided with airbags operable when deployed to protect corners of the vehicle.

9. An airbag deployment system as claimed in claim 1, the system comprising a plurality of airbags which at least one has a plurality of inflatable chambers, wherein at least one of the plurality of airbags is outside of the interior shell of the vehicle when deployed in use.

10. An airbag deployment system for a vehicle, the system comprising:

at least one airbag housed in the vehicle having an interior shell;

a controller operable to determine whether to deploy the at least one airbag;

means for inflating the at least one airbag in response to actuation by the controller, the at least one airbag having a plurality of inflatable chambers, wherein the at least one airbag is positionable relative to the interior shell of the vehicle when deployed in use, said means for inflating arranged to inflate independently the plurality of inflatable chambers to cause, in use, coexistence of inflated states of individual chambers of said plurality of inflatable chambers; and deflation means to enable deflation of at least one of the chambers at a predetermined pressure level in response to an impact, wherein the deflation means defines respective different predetermined pressure levels in respect of the chambers of the airbag.

11. An airbag deployment system as claimed in claim 10, wherein the predetermined pressure level for deflation of a first one of the chambers is lower than the predetermined pressure level for deflation for a second one of the chambers.

12. An airbag deployment system as claimed in claim 11, wherein the chamber wall if formed of a fibrous composite material.

13. An airbag deployment system for a vehicle, the system comprising:
  at least one airbag housed in the vehicle having an interior shell;
  a controller operable to determine whether to deploy the at least one airbag;
  means for inflating the at least one airbag in response to actuation by the controller, wherein the at least one airbag is positionable relative to the interior shell of the vehicle when deployed in use and said at least one airbag comprises a plurality of inflatable chambers; and
  deflation means to enable deflation of at least one of the chambers at a predetermined pressure level in response to an impact, wherein the deflation means defines respective different predetermined pressure levels in respect of the chambers of the airbag, wherein the predetermined pressure level for deflation of a first one of the chambers is lower than the predetermined pressure level for deflation for a second one of the chambers, wherein the first chamber is deployed in use at an outermost position with respect to the second chamber and the vehicle.

14. An airbag deployment system for a vehicle, the system comprising:
  at least one airbag housed in the vehicle having an interior shell;
  a controller operable to determine whether to deploy the at least one airbag; and
  means for inflating the at least one airbag in response to actuation by the controller, the at least one airbag having a plurality of inflatable chambers, wherein the at least one airbag is positionable relative to the interior shell of the vehicle when deployed in use, said means for inflating arranged to inflate independently the plurality of inflatable chambers to cause, in use, coexistence of inflated states of individual chambers of said plurality of inflatable chambers, wherein the at least one airbag comprises between 2 and 10 independent chambers having respective deflation means rupturable at different respective internal pressures.

15. An airbag deployment system as claimed in claim 14, wherein the airbag comprises three chambers.

16. An airbag deployment system for a vehicle, the system comprising:
  at least one airbag housed in the vehicle having an interior shell;
  a controller operable to determine whether to deploy the at least one airbag;
  means for inflating the at least one airbag in response to actuation by the controller, wherein the at least one airbag is positionable relative to the interior shell of the vehicle when deployed in use and said at least one airbag comprises a plurality of inflatable chambers, said means for inflating arranged to inflate independenty the plurality of inflatable chambers to cause, in use, coexistence of inflated states of individual chambers of said plurality of inflatable chambers; and
  sensor means communicating with the controller and operable to determine a relative change in proximity to the vehicle of objects external to the vehicle, wherein the vehicle has a side with side paneling and the sensor means comprises a proximity sensor positioned to detect objects at the side of the vehicle and the system includes airbags operable to protrude outwardly from the side paneling of the vehicle.

17. An airbag deployment system for a vehicle, the system comprising:
  at least one airbag housed in the vehicle having an interior shell;
  a controller operable to determine whether to deploy the at least one airbag;
  means for inflating the at least one airbag in response to actuation by the controller, wherein the at least one airbag is positionable relative to the interior shell of the vehicle when deployed in use and said at least one airbag comprises a plurality of inflatable chambers, said means for inflating arranged to inflate independently the plurality of inflatable chambers to cause, in use, coexistence of inflated states of individual chambers of said plurality of inflatable chambers; and
  sensor means communicating with the controller and operable to determine a relative change in proximity to the vehicle of objects external to the vehicle, wherein the sensor means comprises means for detecting whether a trailing vehicle is approaching at a rate such that impact with said vehicle is inevitable and the system includes an airbag operable to protrude outwardly from a rear end of said vehicle.

18. A vehicle containing an airbag deployment system comprising:
  at least one airbag;
  a controller operable to determine whether to deploy the at least one airbag; and
  means for inflating the at least one airbag in response to actuation by the controller, the at least one airbag having a plurality of inflatable chambers, wherein the at least one airbag is positionable relative to the interior shell of the vehicle when deployed in use, said means for inflating arranged to inflate independently the plurality of inflatable chambers to cause, in use, coexistence of inflated states of individual chambers of said plurality of inflatable chambers.

19. The vehicle of claim 18, wherein the airbag deployment system further comprises deflation means to enable deflation of at least one of the chambers at a predetermined pressure level in response to an impact.

* * * * *